(12) United States Patent
Sakakibara

(10) Patent No.: US 11,535,219 B2
(45) Date of Patent: Dec. 27, 2022

(54) RESERVOIR TANK

(71) Applicant: ADVICS CO., LTD., Kariya (JP)

(72) Inventor: Ryosuke Sakakibara, Kariya (JP)

(73) Assignee: ADVICS CO., LTD., Kariya (JP)

( * ) Notice: Subject to any disclaimer, the term of this patent is extended or adjusted under 35 U.S.C. 154(b) by 768 days.

(21) Appl. No.: 16/478,204

(22) PCT Filed: Jan. 26, 2018

(86) PCT No.: PCT/JP2018/002530
§ 371 (c)(1),
(2) Date: Jul. 16, 2019

(87) PCT Pub. No.: WO2018/139595
PCT Pub. Date: Aug. 2, 2018

(65) Prior Publication Data
US 2019/0366995 A1    Dec. 5, 2019

(30) Foreign Application Priority Data

Jan. 26, 2017 (JP) .............................. JP2017-012186

(51) Int. Cl.
*B60T 11/26* (2006.01)
*B60T 17/06* (2006.01)
(Continued)

(52) U.S. Cl.
CPC ............. *B60T 11/26* (2013.01); *B60T 17/06* (2013.01); *F16D 25/12* (2013.01); *B60T 11/16* (2013.01); *F15B 1/26* (2013.01)

(58) Field of Classification Search
CPC ................................. B60T 11/26; B60T 17/06
(Continued)

(56) References Cited

U.S. PATENT DOCUMENTS 2,316,729 A * 4/1943 Tryon ....................... F15B 1/26
251/126
4,200,205 A * 4/1980 Ban ......................... B60T 11/26
220/555
(Continued)

FOREIGN PATENT DOCUMENTS

CN         104454679 A  *  3/2015
JP         2011025736 A     2/2011
(Continued)

OTHER PUBLICATIONS

International Search Report (PCT/ISA/210) and translation and Written Opinion (PCT/ISA/237) dated Feb. 27, 2018, by the Japanese Patent Office as the International Searching Authority for International Application No. PCT/JP2018/002530.

*Primary Examiner* — Thomas J Williams
(74) *Attorney, Agent, or Firm* — Buchanan Ingersoll & Rooney PC

(57) ABSTRACT

This reservoir tank is provided with a reservoir body formed in the shape of a hollow box inside which a hydraulic fluid is stored, and is connected to a vehicle master cylinder in such a way that brake fluid flows into and out of the same. The reservoir body is provided with a top plate portion formed in the shape of a plate. A flow path portion having one or a plurality of flow paths formed in a serpentine fashion and opening downward in a vertical direction is provided in a protruding manner on an inner wall surface of the top plate portion, and a slit is provided on a downstream side of the flow path.

7 Claims, 9 Drawing Sheets

(51) Int. Cl.
*F16D 25/12* (2006.01)
*B60T 11/16* (2006.01)
*F15B 1/26* (2006.01)

(58) Field of Classification Search
USPC .......................................................... 60/585
See application file for complete search history.

(56) References Cited

U.S. PATENT DOCUMENTS 4,514,980 A * 5/1985 Ishiwata ................. B60T 11/26
60/592
7,448,211 B2 * 11/2008 Hayashi .................. B60T 11/26
60/534

FOREIGN PATENT DOCUMENTS

JP          2011102046 A       5/2011
WO    WO-2014069024 A1 *  5/2014    ......... B01D 19/0036

* cited by examiner

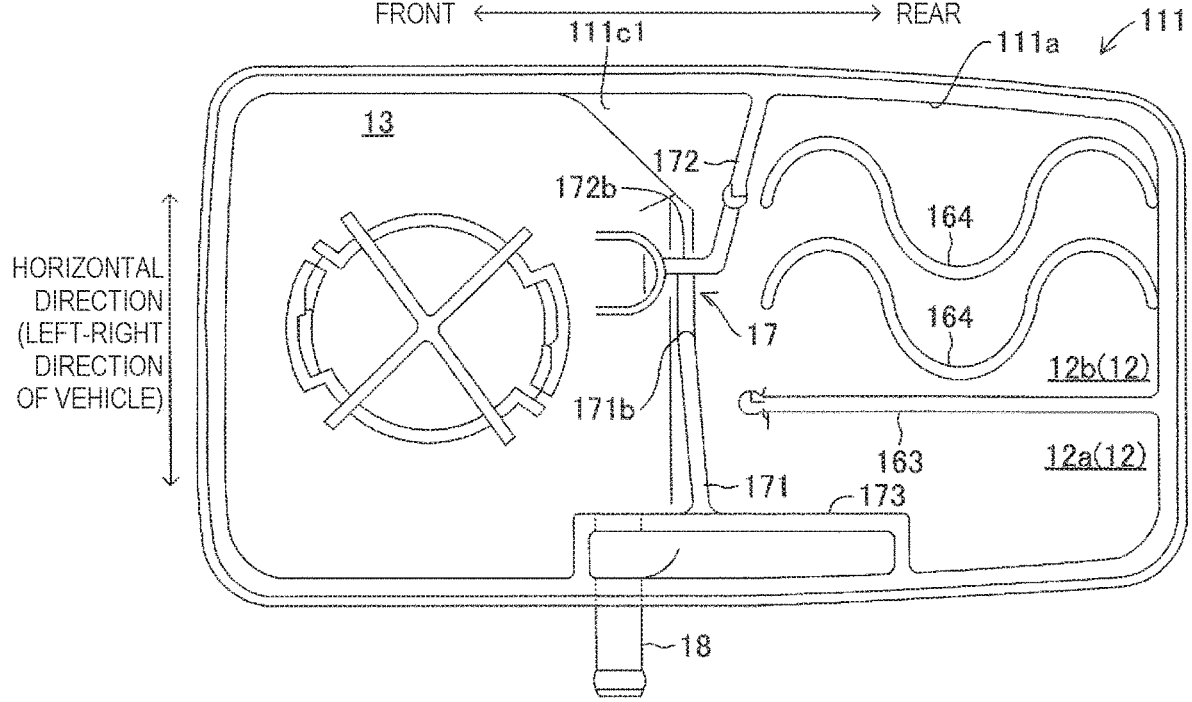
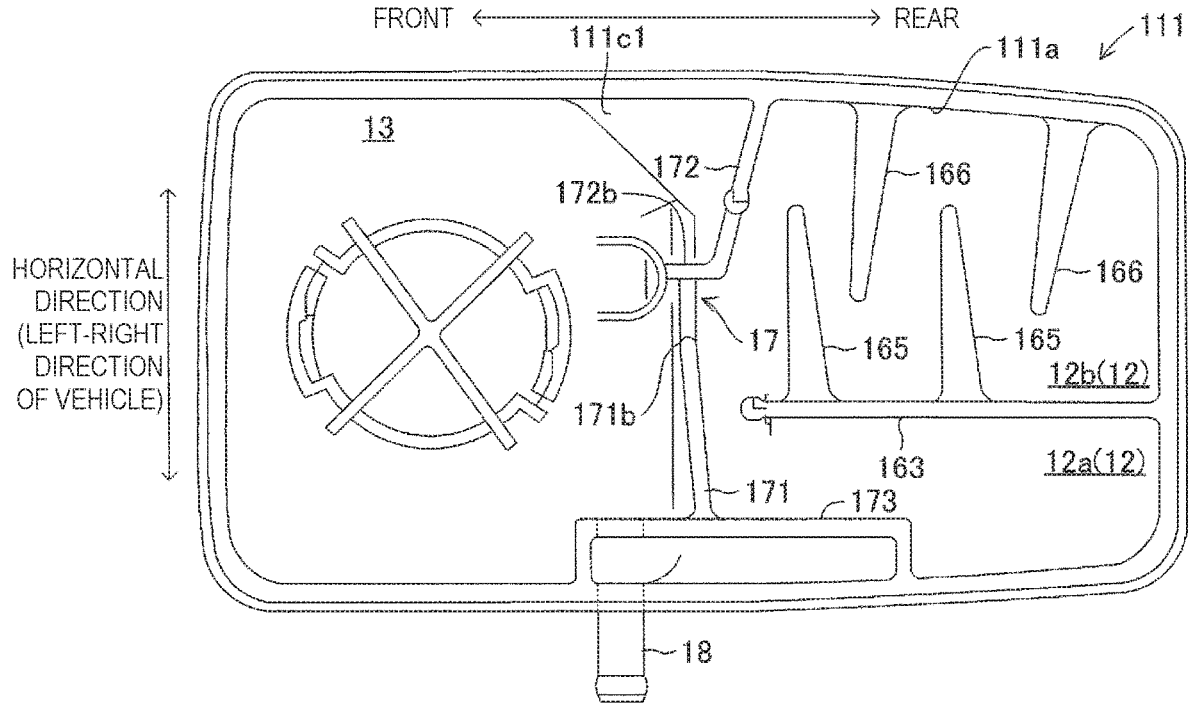

RESERVOIR TANK

TECHNICAL FIELD

The present invention relates to a reservoir tank for storing a hydraulic fluid to be supplied to a hydraulic master cylinder.

BACKGROUND ART

In the related art, for example, a reservoir of a hydraulic master cylinder for a vehicle disclosed in the following Patent Literature 1 has been known. In the reservoir of the hydraulic master cylinder for a vehicle according to the related art, a partition wall for partitioning the inside of a liquid storage chamber of the main body of the reservoir is provided, and in at least the upper end part of the partition wall which is in contact with the lower surface of the top plate of the liquid storage chamber, a slit is formed. Also, the partition wall has an air bleeding inclined face rising toward the slit.

CITATION LIST

Patent Literature

Patent Literature 1: JP-A-2011-102046

SUMMARY OF INVENTION

Technical Problem

In the reservoir (reservoir tank) of the hydraulic master cylinder for a vehicle according to the related art, if the hydraulic fluid shakes inside the liquid storage chamber, for example, during braking of the vehicle, large air bubbles may occur in the stored hydraulic fluid as shown in FIG. 12. In the case where large air bubbles have occurred in the hydraulic fluid, the air bubbles quickly move toward an atmosphere air chamber which is formed inside the reservoir tank with stopping of the vehicle. Then, the large air bubbles having reached the atmosphere air chamber burst inside the atmosphere air chamber, and the impact forces which occur when the air bubbles burst vibrate the reservoir tank. In this case, if the vibration is transmitted to the brake pedal, for example, via the master cylinder and so on, the driver who is performing the braking operation may feel discomfort.

The present invention was made for solving the above-mentioned problem. In other words, an object of the present invention is to provide a reservoir tank capable of suppressing vibration of a reservoir tank attributable to burst of air bubbles generated in a hydraulic fluid, thereby preventing a driver who is performing a braking operation from feeling discomfort.

Solution to Problem

In order to achieve the above-mentioned object, the present invention is a reservoir tank which includes a reservoir body formed in a hollow box shape for storing a hydraulic fluid, and is connected to a vehicle master cylinder in such a way that the hydraulic fluid flows into and out, wherein the reservoir body includes a top plate portion formed in a plate shape, and on the inner wall surface of the top plate portion, a flow path portion which has one or more flow paths formed in a serpentine fashion so as to be opened toward the lower side in a vertical direction is provided in a protruding manner, and on the downstream side of the flow path, an opening is formed.

Advantageous Effects of Invention

According to this, for example, when the vehicle pitches or rolls, and the hydraulic fluid in the reservoir tank shakes in the front-rear direction and the left-right direction, if the fluid surface level of the hydraulic fluid rises, air bubbles between the fluid surface level of the hydraulic fluid and the top plate portion are pushed into the flow path portion provided on the inner wall surface of the top plate portion by the hydraulic fluid. At this time, in the flow path portion, a plurality of relatively small air bubbles according to the size of the flow path are generated (the air bubbles are broken up). The air bubbles broken up as described above flow toward the opening formed on the downstream side of the flow path. In this case, since the flow path is formed in the serpentine fashion, and the flow path length can be set to be relatively long, it is possible to set the time required for air bubbles broken up to reach the opening to be long.

Therefore, it is possible to decrease air bubbles which burst in the reservoir tank, and decrease the impact forces which occur when air bubbles burst, thereby suppressing vibration of the reservoir body, i.e. the reservoir tank. As a result, it is possible to effectively suppress transmission of vibration of the reservoir tank to the brake pedal, for example, via the master cylinder and so on, and it is possible to prevent the driver who is performing a braking operation from feeling discomfort.

BRIEF DESCRIPTION OF DRAWINGS

FIG. 10 is a view illustrating a flow path portion according to another modification of the present invention.

FIG. 11 is a view illustrating a flow path portion according to another modification of the present invention.

DESCRIPTION OF EMBODIMENTS

Figure 1:
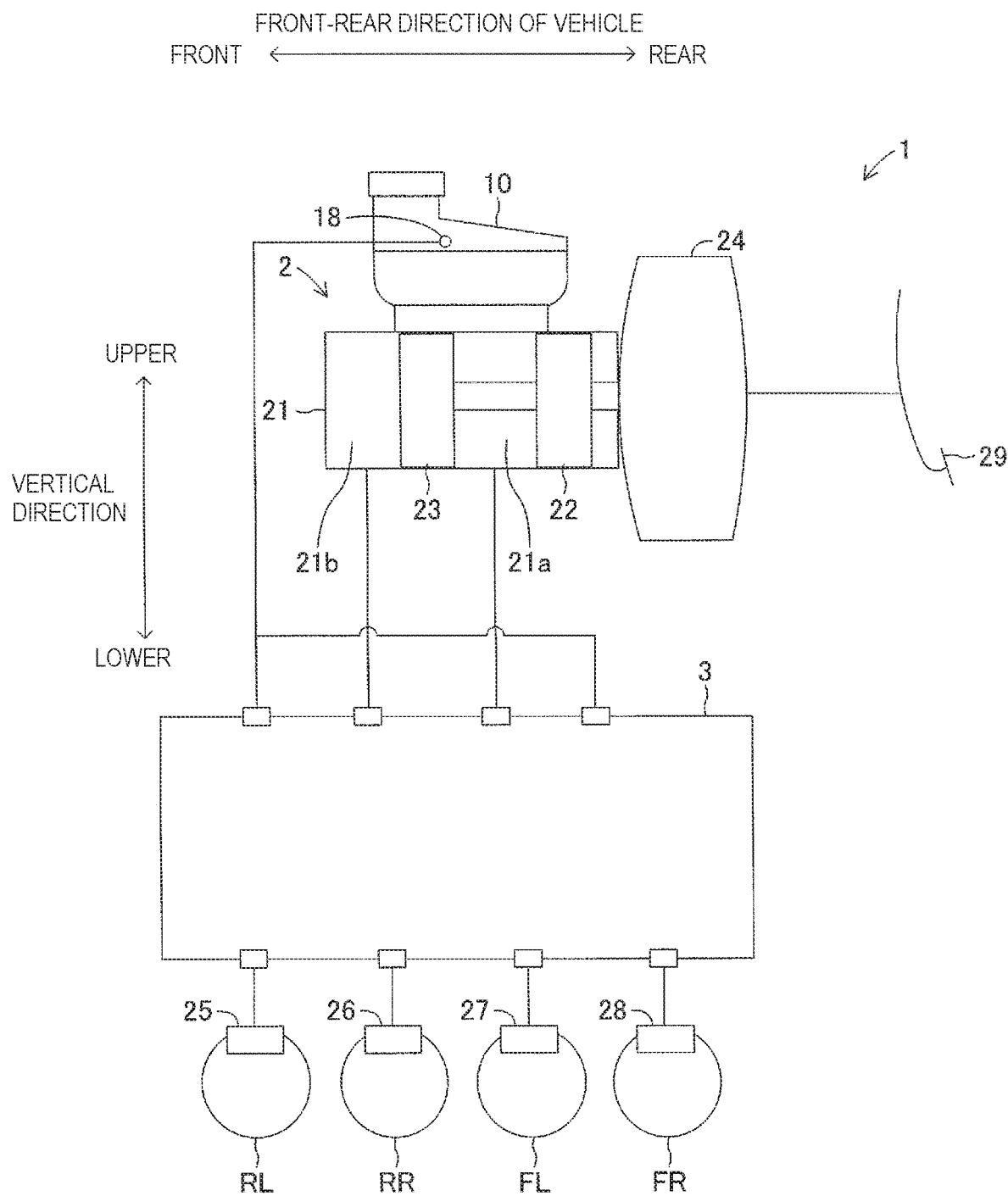
FIG. 1 is a view illustrating the configuration of a brake device in which a reservoir tank according to an embodiment of the present invention can be installed.

Hereinafter, an embodiment of the present invention will be described with reference to the drawings. Also, parts identical or equivalent to each other in the following embodiment and the following individual modifications are denoted by the same reference symbols in the drawings. Also, the drawings which are used for explanation are conceptual views, and the shapes of some parts may not be strict.

A reservoir tank 10 of the present embodiment is a reservoir tank which constitutes a brake device 1 of a vehicle, as shown in FIG. 1. The brake device 1 of the vehicle includes a cylinder mechanism 2. The cylinder mechanism 2 includes a vehicle master cylinder (hereinafter, referred to simply as the master cylinder) 21, master pistons 22 and 23, and a brake booster 24. The master pistons 22 and 23 are installed inside the master cylinder 21 so as to be able to slide. The master pistons 22 and 23 define the inside of the vehicle master cylinder 21 into a first master chamber 21a and a second master chamber 21b. The brake booster 24 is, for example, a negative pressure type booster device, and boosts a depression force applied by the driver, and transmits the boosted force to the master pistons 22 and 23.

Also, the cylinder mechanism 2 includes a wheel cylinder 25, a wheel cylinder 26, a wheel cylinder 27, and a wheel cylinder 28. The wheel cylinder 25 is disposed on the rear left wheel RL of the vehicle. The wheel cylinder 26 is disposed on the rear right wheel RR of the vehicle. The wheel cylinder 27 is disposed on the front left wheel FL of the vehicle. The wheel cylinder 28 is disposed on the front right wheel FR of the vehicle. The master cylinder 21 and the individual wheel cylinders 25 to 28 are connected via an actuator 3. According to this, the individual wheel cylinders 25 to 28 give a braking force to the rear left wheel RL, the rear right wheel RR, the front left wheel FL, and the front right wheel FR. Also, although a detailed description will not be made, the actuator 3 is composed of pipelines, an electric pump, an electromagnetic valve, a check valve, and so on (not shown in the drawings).

In the brake device 1 of the vehicle, if the driver depresses a brake pedal 29, the depression force is boosted by the brake booster 24 airtightly connected to the master cylinder 21, and the master pistons 22 and 23 in the master cylinder 21 are pushed. To the master cylinder 21, the reservoir tank 10 for storing hydraulic fluid (brake fluid) and letting the hydraulic fluid flow in and out is connected so as to be communicably connected to the first master chamber 21a and the second master chamber 21b. According to this, in the first master chamber 21a and the second master chamber 21b, the same master cylinder pressure is generated by the brake fluid. Then, the master cylinder pressure is transmitted to the wheel cylinders 25 to 28 by the brake fluid which flows in and out from the reservoir tank 10 having a pipeline connected to the first master chamber 21a and the second master chamber 21b through the actuator 3.

Figure 2:
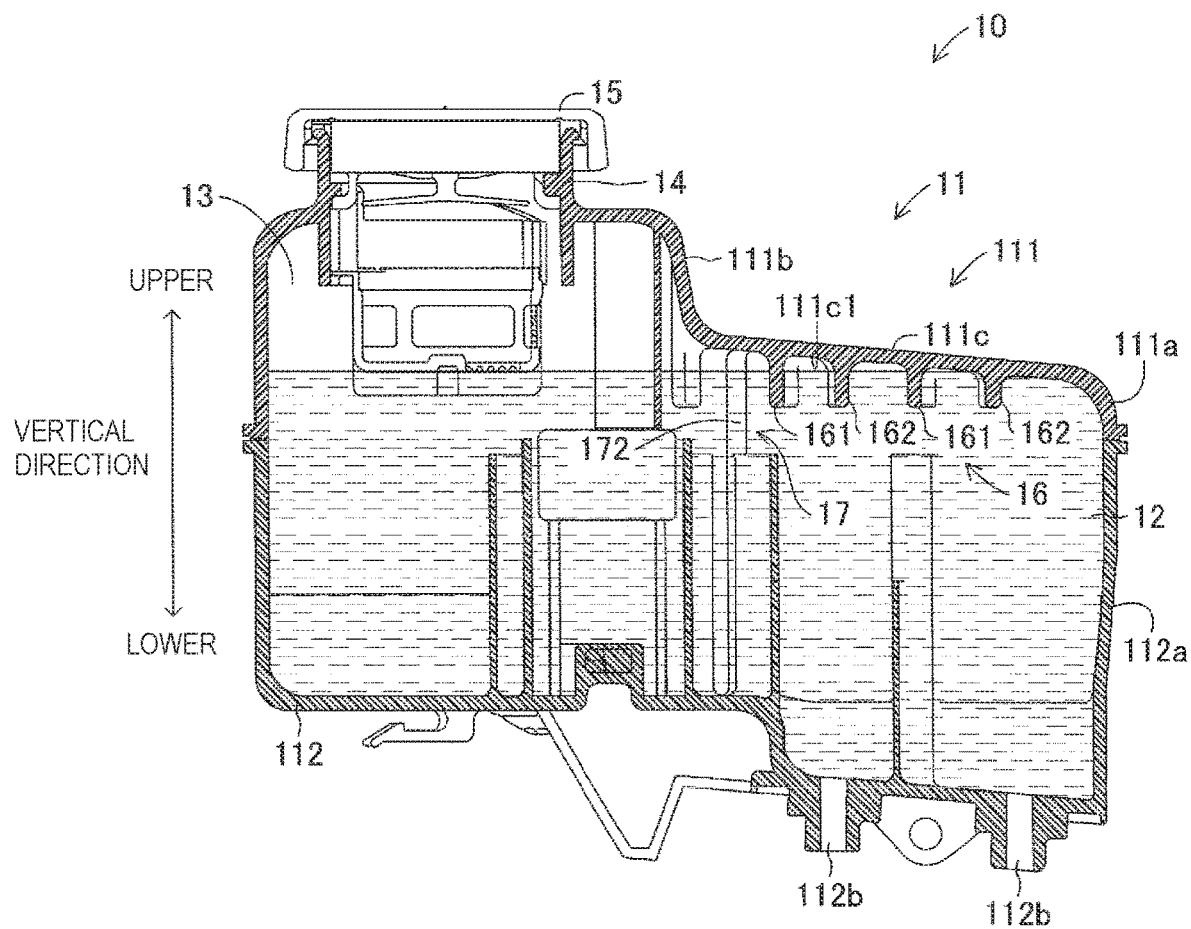
FIG. 2 is an overall view illustrating the configuration of the reservoir tank of FIG. 1.

The reservoir tank 10 includes a reservoir body 11 formed of, for example, a translucent resin material in a hollow box shape, as shown in FIG. 2. The reservoir body 11 has a storage chamber 12 which is a space for storing the brake fluid as the hydraulic fluid, inside it. Also, the reservoir body 11 has an atmosphere air chamber 13 which is a space which is formed above the fluid surface level of the stored brake fluid in the vertical direction, inside it, in a state where a predetermined amount of brake fluid has been injected into the storage chamber 12. Also, the reservoir body 11 has a cylindrical injection part 14 which is connected to the atmosphere air chamber 13 and through which the brake fluid is injected into the storage chamber 12. Also, on the injection part 14 of the reservoir body 11, a cap 15 for airtightly covering an opening side end part is assembled. Here, the reservoir tank 10 is assembled with the master cylinder 21 such that the atmosphere air chamber 13 is positioned on the front side in the front-rear direction of the vehicle, as shown in FIG. 1 and FIG. 2.

The reservoir body 11 according to the present embodiment is composed of an upper reservoir 111 which is positioned on the upper side in the vertical direction, and a lower reservoir 112 which is positioned on the lower side in the vertical direction, as shown in FIG. 2. The peripheral edge end part of the upper reservoir 111 has a peripheral wall part 111a formed upright downward in the vertical direction. The peripheral edge end part of the lower reservoir 112 has a peripheral wall part 112a formed upright upward in the vertical direction. By these, the end part of the peripheral wall part 111a and the end part of the peripheral wall part 112a are bonded, for example, by thermal welding, whereby the upper reservoir 111 and the lower reservoir 112 form the reservoir body 11.

The upper reservoir 111 has a bulge part 111b which bulges upward in the vertical direction in the cross section shape along the vertical direction and in which the injection part 14 is formed, as shown in FIG. 2. The bulge part 111b forms the atmosphere air chamber 13 in a state where the upper reservoir 111 forms the reservoir body 11 together with the lower reservoir 112 and the brake fluid is stored in the storage chamber 12. Also, the upper reservoir 111 has a plate-shaped top plate portion 111c which is connected to the lower end of the bulge part 111b in the vertical direction and is inclined downward in the vertical direction as it goes away from the bulge part 111b in the horizontal direction. The top plate portion 111c forms the storage chamber 12 in the state where the upper reservoir 111 forms the reservoir body 11 together with the lower reservoir 112.

The lower reservoir 112 has a pipeline 112b which is communicably connected to the master cylinder 21. Specifically, the pipeline 112b is configured to connect the storage chamber 12 to the first master chamber 21a and the second master chamber 21b of the master cylinder 21. Further, the pipeline 112b is configured to supply the brake fluid stored in the storage chamber 12 to the first master chamber 21a and the second master chamber 21b as the master pistons 22 and 23 operate, and return the brake fluid in the first master chamber 21a and the second master chamber 21b to the storage chamber 12. Furthermore, since the configuration of the lower reservoir 112 is the same as that of the reservoir tank of the related art, and is not directly related to the present invention, a description of the other configuration and operation will not be made.

Figure 3:
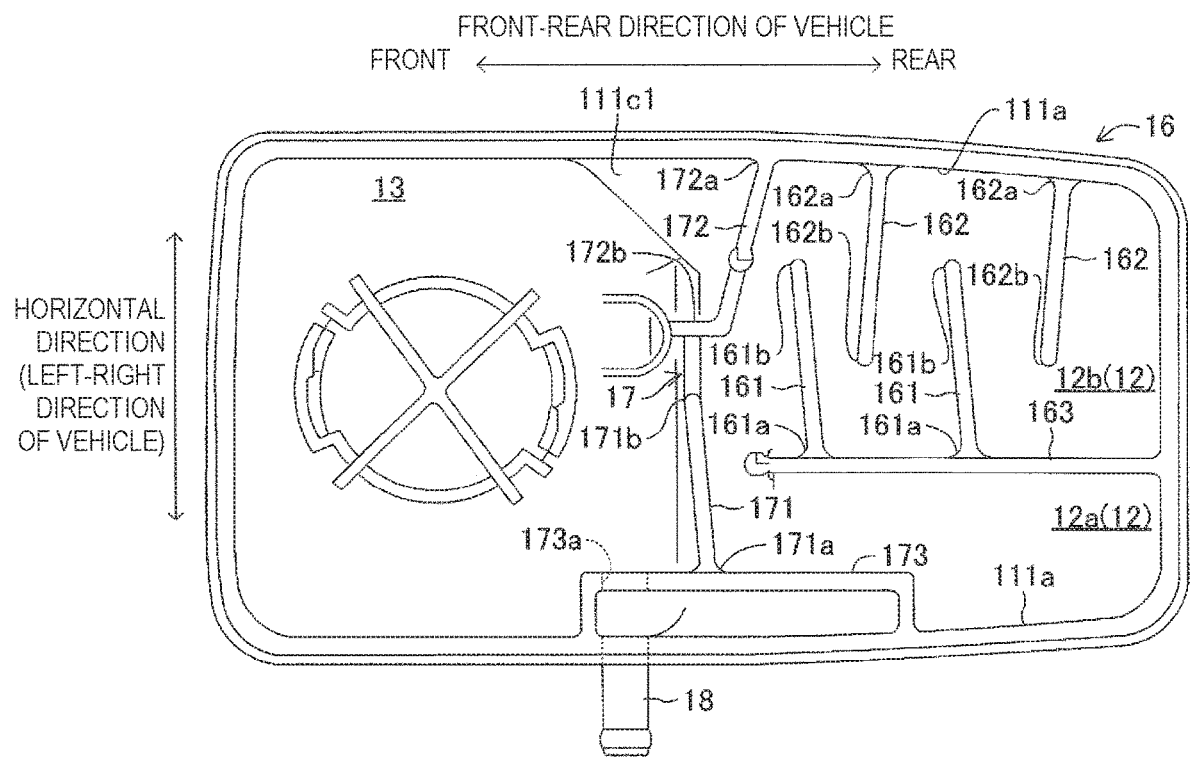
FIG. 3 is a view illustrating the configuration of an upper reservoir which forms the reservoir tank of FIG. 2.

In the upper reservoir 111, as shown in FIG. 2 and FIG. 3, on the downstream side (i.e. the side close to the atmosphere air chamber 13) of a flow path portion 16 provided in a protruding manner on an inner wall surface 111c1 of the top plate portion 111c (i.e. the surface which forms the storage chamber 12 and faces the lower reservoir 112) and a flow path which is formed by the flow path portion 16, a slit 17 which is an opening is formed. The flow path portion 16 is provided in the protruding manner on the inner wall surface 111c1 of the top plate portion 111c, and has a flow path R (see FIG. 8) formed in a serpentine fashion so as to be opened downward in a vertical direction. The flow path portion 16 is composed of a plurality of first ribs 161 and a plurality of second ribs 162 arranged from the storage chamber 12 toward the atmosphere air chamber 13 and disposed so as to face each other, as shown in FIG. 3. Also, in the present embodiment, the flow path portion 16 is composed of two first ribs 161 and two second ribs 162 provided in the protruding manner on the inner wall surface 111c1 of the top plate portion 111c.

As shown in FIG. 2, each of the plurality of first ribs 161 is provided in the protruding manner downward in the vertical direction, and its upper end is connected to the inner wall surface 111c1 of the top plate portion 111c in the vertical direction. Also, as shown in FIG. 3, a base end (161a) side of each of the plurality of first ribs 161 is connected to a first partition plate 163 (i.e. the inner surface of the reservoir body 11), and extends toward the plurality of second ribs 162. Here, the base end length Dk of the base end 161a of each first rib 161 in a direction along the vertical direction is set to be longer than the leading end length Ds of a leading end 161b of the corresponding first rib 161 in the direction along the vertical direction, i.e. such that the corresponding first rib has a substantial L shape, similarly to the second rib 162 shown in FIG. 4. The first partition plate 163 is a plate which is provided upright downward in the vertical direction from the top plate portion 111c and partitions the storage chamber 12 which is formed in the reservoir body 11 into a communication path side storage chamber 12a including the pipeline 112b provided in the lower reservoir 112, and a flow path portion side storage chamber 12b including the flow path portion 16. Also, although not shown in the drawings, on the lower reservoir 112, a partition plate which is provided upright upward in the vertical direction from the bottom surface of the lower reservoir 112 and is connected integrally with the first partition plate 163 of the upper reservoir 111 is provided.

Figure 4:
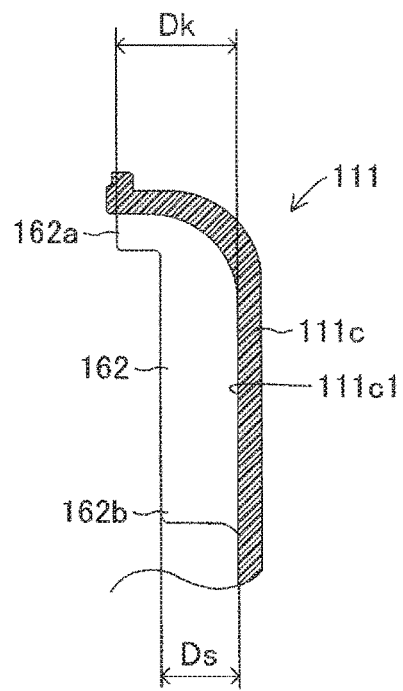
FIG. 4 is a view for explaining the shapes of a first rib and a second rib of FIG. 3.

Each of the plurality of second ribs 162 is provided in the protruding manner downward in the vertical direction, and its upper end is connected to the inner wall surface 111c1 of the top plate portion 111c in the vertical direction, as shown in FIG. 2. Also, as shown in FIG. 3, a base end (162a) side of each of the plurality of second ribs 162 is connected to the peripheral wall part 111a of the upper reservoir 111 (i.e. the inner surface of the reservoir body 11), and each second rib extends toward the plurality of first ribs 161. Here, the base end length Dk of the base end 162a of each second rib 162 is set to be longer than the leading end length Ds of a leading end 162b of the corresponding second rib 162, i.e. such that the corresponding second rib has a substantial L shape, as shown in FIG. 4.

The leading end (161b) sides of the plurality of individual first ribs 161, and the leading end (162b) sides of the plurality of individual second ribs 162 extend so as to overlap each other in the direction from the storage chamber (12) side toward the atmosphere air chamber (13) side, as shown in FIG. 3. In other words, the leading end 161b of at least one first rib 161 of the plurality of first ribs 161 is disposed so as to enter between two neighboring second ribs 162 (more specifically, two leading ends 162b), and the leading end 162b of at least one second rib 162 of the plurality of second ribs 162 is disposed so as to enter between two neighboring first ribs 161 (more specifically, two leading ends 161b). Also, the leading end 161b of each of the plurality of first ribs 161 is disposed from the storage chamber (12) side toward the atmosphere air chamber (13) side with reference to the base end 161a of each of the plurality of first ribs 161. Similarly, the leading end 162b of each of the plurality of second ribs 162 is disposed from the storage chamber (12) side toward the atmosphere air chamber (13) side with reference to the base end 162a of each of the plurality of second ribs 162. In other words, the leading ends 161b and the leading ends 162b of the plurality of first ribs 161 and the plurality of second ribs 162 are disposed on the slit (17) side (the opening side) which is the downstream side of the flow path R from the base ends 161a and the base ends 162a.

Further, the lower ends of the plurality of first ribs 161 and the plurality of second ribs 162 in the vertical direction are provided so as to enter the brake fluid by the same length with respect to the fluid surface level of the brake fluid in the case where the vehicle is not being braked, in a state where the upper reservoir 111 forms the reservoir body 11 together with the lower reservoir 112 and the brake fluid is stored in the storage chamber 12. In other words, in this case, since the plurality of first ribs 161 and the plurality of second ribs 162 are connected to the inner wall surface 111c1 of the top plate portion 111c inclined downward in the vertical direction, as shown in FIG. 2, as it goes from the storage chamber (12) side toward the atmosphere air chamber (13) side, the lengths when the top plate portion 111c is defined as a reference sequentially lengthen.

Figure 5:
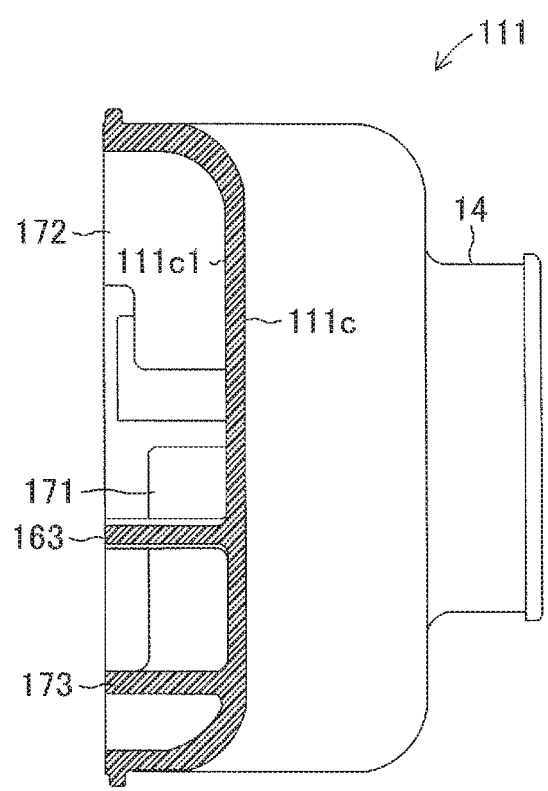
FIG. 5 is a view for explaining the arrangement of a first wall member and a second wall member of FIG. 3.

The slit 17 which is an opening is a slit for restricting the sizes of air bubbles to enter the atmosphere air chamber 13 by coming into contact with air bubbles when generated air bubbles flow from the storage chamber 12 to the atmosphere air chamber 13 as will be described below. As shown in FIG. 2, FIG. 3, and FIG. 5, the slit 17 is formed by a first wall member 171 which partitions the communication path side storage chamber 12a and the atmosphere air chamber 13, and a second wall member 172 which partitions the flow path portion side storage chamber 12b and the atmosphere air chamber 13. In other words, the slit 17 is a gap which is formed by the pair of the first wall member 171 and the second wall member 172 facing each other, as shown in FIG. 5. Also, the magnitude of the slit width of the slit 17 is set according to the sizes of air bubbles to be allowed to enter the atmosphere air chamber 13. The first wall member 171 and the second wall member 172 are provided on the side (the flow path portion side) closer to the flow path portion 16 side than to the end part (the boundary position with the bulge part 111b) of the top plate portion 111c of the upper reservoir 111, in other words, on the side closer to the storage chamber 12 than to the atmosphere air chamber 13 in the horizontal direction, as shown in FIG. 3.

The first wall member 171 is provided in a protruding manner downward in the vertical direction from the top plate portion 111c of the upper reservoir 111, as shown in FIG. 2. Also, the base end (171a) side of the first wall member 171 is connected to a second partition plate 173 connected to the peripheral wall part 111a of the upper reservoir 111, and the first wall member extends toward the second wall member 172 as shown in FIG. 3 and FIG. 5.

Here, the second partition plate 173 is a plate which is provided upright downward in the vertical direction from the top plate portion 111c, and partitions the communication path side storage chamber 12a, and an introduction pipe 18 which is provided on the upper reservoir 111 in order to introduce the brake fluid from the outside (for example, the master cylinder 21). For this reason, on the side of the second partition plate 173 closer to the atmosphere air chamber 13 than to the base end side of the second wall member 172, a communication path 173a is formed. Therefore, for example, even in a state where the function of a filter (not shown in the drawings) has deteriorated, the brake fluid from the introduction pipe 18 flows into the storage chamber 12 (specifically, the flow path portion side storage chamber 12b) through the communication path 173a.

The second wall member 172 is provided in the protruding manner downward in the vertical direction from the top plate portion 111c of the upper reservoir 111, as shown in FIG. 2. Also, as shown in FIG. 3, the base end (172a) side of the second wall member 172 is connected to the peripheral wall part 111a of the upper reservoir 111, and the second wall member extends toward the first wall member 171.

Also, a leading end 171b of the first wall member 171 is disposed from the storage chamber (12) side toward the atmosphere air chamber (13) side with reference to the base end 171a of the first wall member 171. Similarly, a leading end 172b of the second wall member 172 is disposed from the storage chamber (12) side toward the atmosphere air chamber (13) side with reference to the base end 172a of the second wall member 172. In other words, the first wall member 171 and the second wall member 172 are disposed such that the leading end 171b and the leading end 172b are closer to the atmosphere air chamber 13 than the base end 171a and the base end 172a are.

Figure 6:
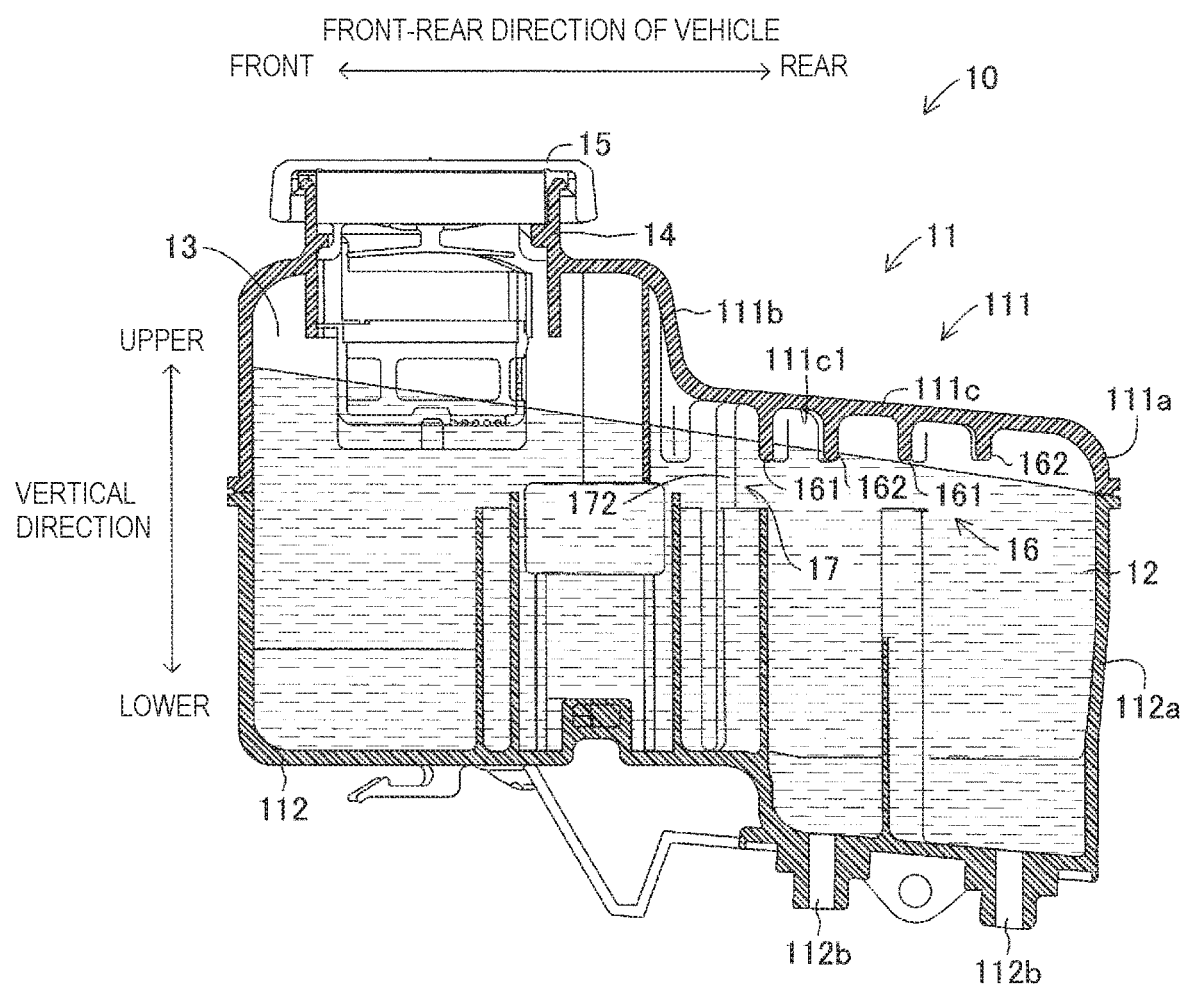
FIG. 6 is a schematic diagram illustrating a bias of a hydraulic fluid in the reservoir tank during braking.

The vehicle having the reservoir tank 10 configured as described above decelerates, for example, if the brake pedal 29 is depressed by the driver, i.e. if the master cylinder 21 generates a master cylinder pressure using the brake fluid stored in the reservoir tank 10 such that a braking force is applied to the rear left wheel RL to the front right wheel FR. In this case, if the vehicle decelerates by a predetermined deceleration or more, pitching occurs in the vehicle, and in the reservoir tank 10, as shown in FIG. 6, the brake fluid stored in the storage chamber 12 is biased to one side in the horizontal direction (i.e. the front side in the front-rear direction of the vehicle). Here, in the present embodiment, since the atmosphere air chamber 13 is provided so as to be positioned on the front side in the front-rear direction of the vehicle, in the vehicle which is decelerating by the predetermined deceleration or more, the brake fluid is biased to the atmosphere air chamber (13) side. As a result, the fluid surface level of the brake fluid stored in the storage chamber 12 relatively lowers, and air enters between the fluid surface level and the inner wall surface 111c1 of the top plate portion 111c of the upper reservoir 111.

Figure 12:
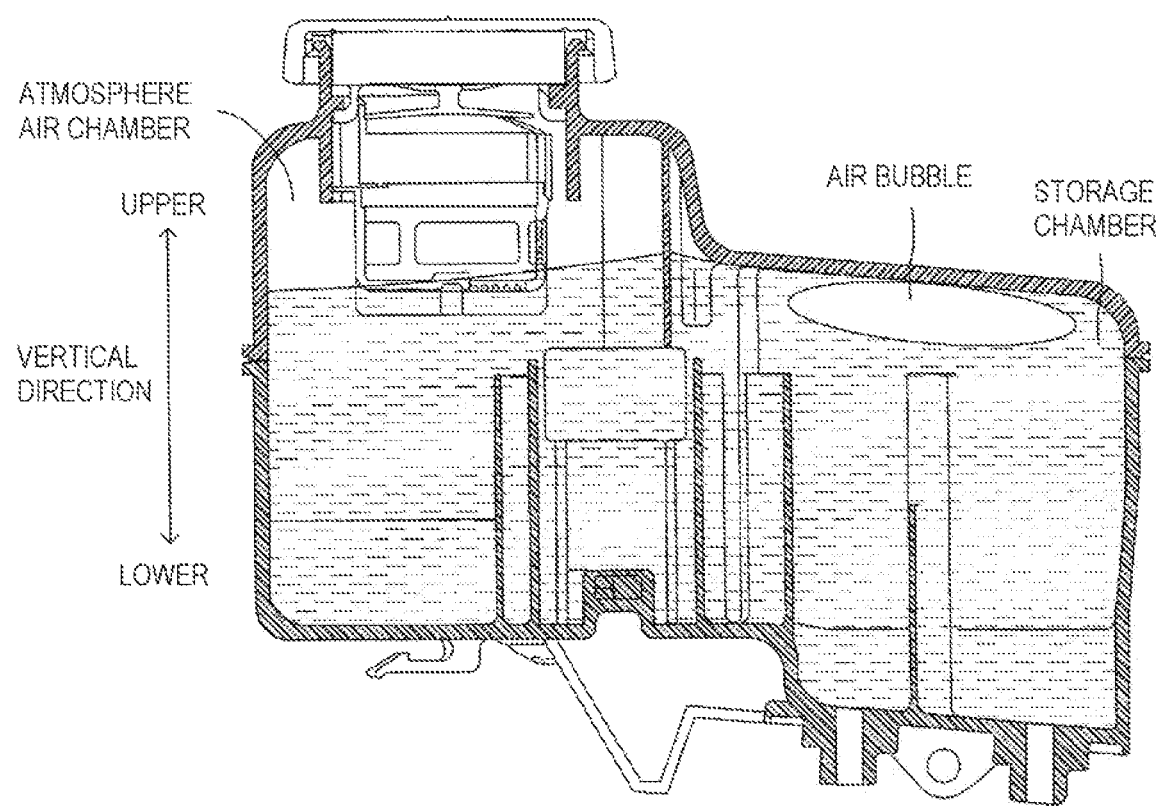
FIG. 12 is a view for explaining air bubbles which are generated by a bias of a hydraulic fluid in a reservoir tank according to the related art.

By the way, the reservoir body 11 (the reservoir tank 10) has the flow path portion 16 provided in the protruding manner on the inner wall surface 111c1 of the top plate portion 111c of the upper reservoir 111, and the slit 17. According to this, since the first ribs 161 and the second ribs 162 constituting the flow path portion 16, and the first wall member 171 and the second wall member 172 forming the slit 17 serve as resistances, the flow of the brake fluid stored in the storage chamber 12 to the atmosphere air chamber (13) side is hindered. As a result, the rate of flow of the brake fluid stored in the storage chamber 12 to the atmosphere air chamber (13) side decreases as compared to the case where the flow path portion 16 and the slit 17 are not provided. Therefore, in the reservoir body 11 (the reservoir tank 10) having the flow path portion 16 and the slit 17, the amount of air which enters between the fluid surface level of the brake fluid and the inner wall surface 111c1 of the top plate portion 111c of the upper reservoir 111 decreases. In other words, in the reservoir body 11 (the reservoir tank 10) having the flow path portion 16 and the slit 17, bubbles of air (air bubbles) which are generated in the brake fluid stored in the storage chamber 12 by air having entered decrease as compared to the reservoir tank of the related art shown in FIG. 12.

Figure 7:
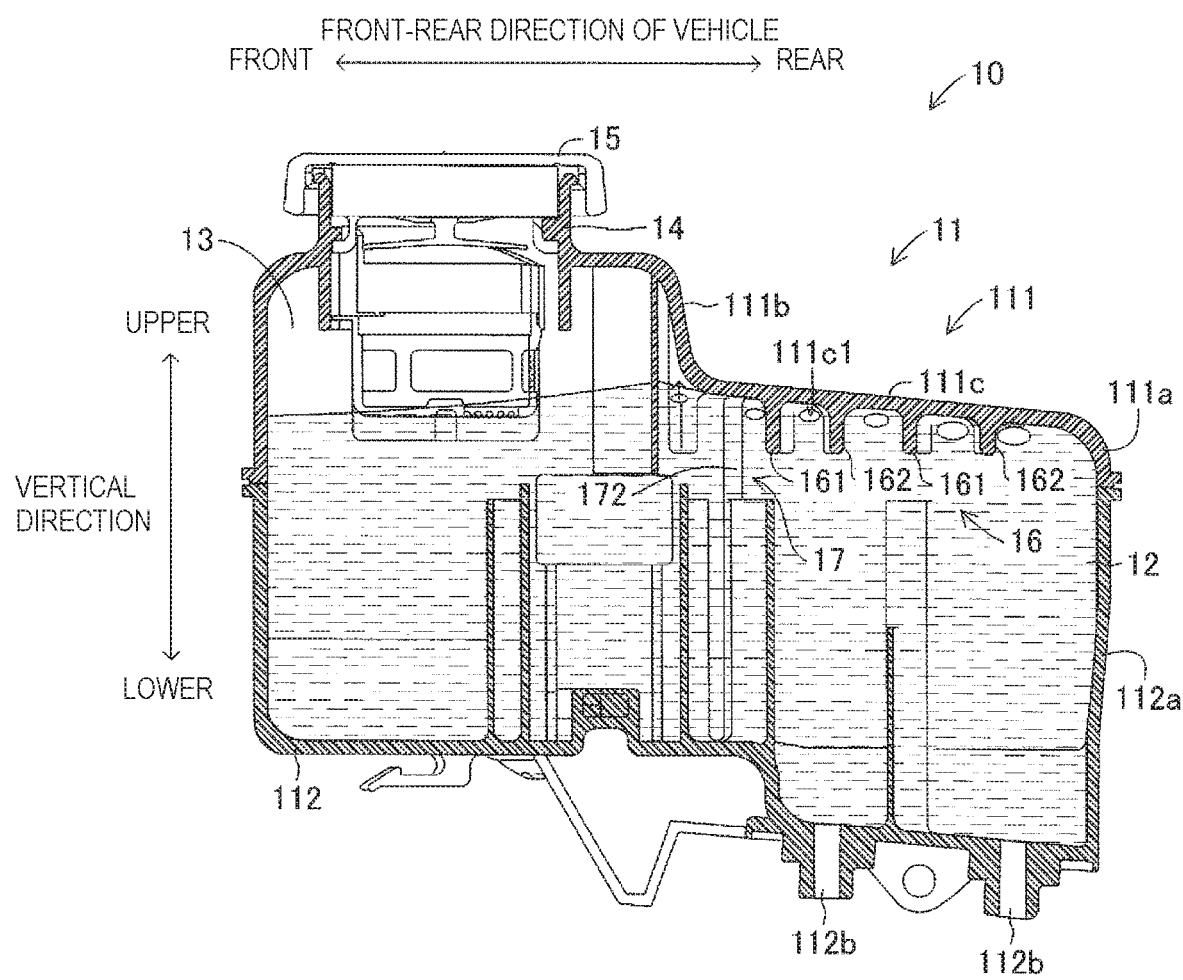
FIG. 7 is a schematic diagram illustrating a state where air bubbles have generated by the bias of the hydraulic fluid shown in FIG. 6.

Thereafter, if the deceleration decreases, the brake fluid having flowed to the atmosphere air chamber (13) side returns toward the storage chamber 12, whereby the bias of the brake fluid described above is eliminated. At this time, since the fluid surface level of the brake fluid rises as shown in FIG. 7, the air bubbles which are generated in the brake fluid stored in the storage chamber 12 are pushed into the flow path portion 16 provided on the inner wall surface 111c1 of the top plate portion 111c. Therefore, the air bubbles are divided according to the size of the flow path R which is formed by the first ribs 161 and the second ribs 162, and are broken up more finely as compared to the reservoir tank of the related art shown in FIG. 12.

Figure 8:
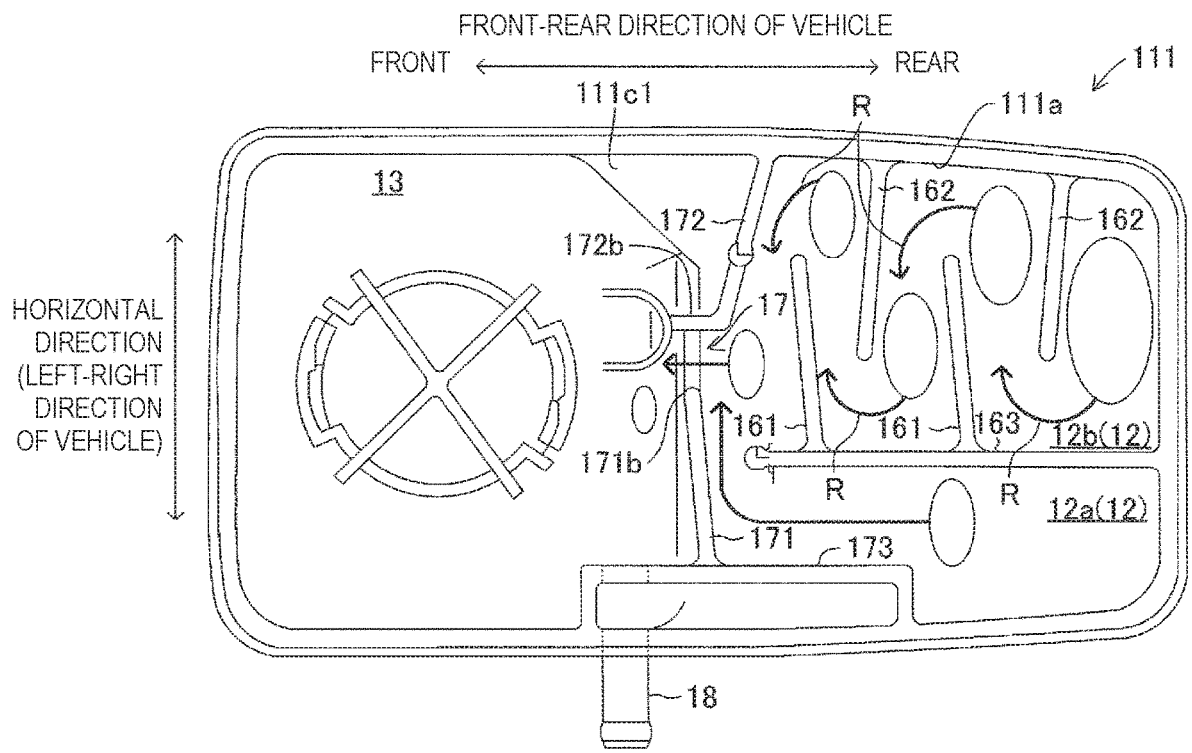
FIG. 8 is a view for explaining flowing of air bubbles along a flow path portion.

The air bubbles broken up by the first ribs 161 and the second ribs 162 in the flow path portion side storage chamber 12b flow toward the atmosphere air chamber 13 while meandering, along the flow path R formed so as to meander by the first ribs 161 and the second ribs 162, as shown in FIG. 8. In this case, the flow path length of the flow path R which is formed by the flow path portion 16 becomes longer as compared to the case where air bubbles flow linearly from the storage chamber 12 toward the atmosphere air chamber 13. As a result, the individual air bubbles broken up flow toward the atmosphere air chamber 13, sequentially and slowly, over a long time.

Further, the individual air bubbles broken up reach the atmosphere air chamber 13 through the slit 17. In this case, air bubbles larger than the slit width of the slit 17, i.e. the gap between the leading end 171b of the first wall member 171 and the leading end 172b of the second wall member 172 are broken up again by the slit 17. Therefore, the air bubbles which flow into the atmosphere air chamber 13 finally become air bubbles having restricted sizes equal to or smaller than the slit width of the slit 17, and burst (break) on the fluid surface level connected to the atmosphere air chamber 13. Also, the air bubbles generated in the communication path side storage chamber 12a are further broken up by the first partition plate 163 and the second partition plate 173, and reach the slit 17, as shown in FIG. 8. Further, the air bubbles generated in the communication path side storage chamber 12a also finally become air bubbles having restricted sizes equal to or smaller than the slit width of the slit 17, and burst (break) on the fluid surface level connected to the atmosphere air chamber 13.

As can be understood from the above description, the reservoir tank 10 of the embodiment is a reservoir tank which includes the reservoir body 11 formed in the hollow box shape for storing the brake fluid which is a hydraulic fluid inside it, and is connected to the vehicle master cylinder 21 in such a way that the brake fluid flows into and out, wherein the reservoir body 11 includes the top plate portion 111c formed in a plate shape, and on the inner wall surface 111c1 of the top plate portion 111c, the flow path portion 16 having the flow path R formed in the serpentine fashion to be opened downward in the vertical direction is provided in the protruding manner, and the slit 17 which is an opening is formed on the downstream side of the flow path R.

According to this, when the vehicle pitches during braking, and the brake fluid in the reservoir tank 10 shakes in the front-rear direction, if the fluid surface level of the brake fluid rises, air bubbles between the fluid surface level of the brake fluid and the top plate portion 111c are pushed into the flow path portion 16 provided on the inner wall surface 111c1 of the top plate portion 111c by the brake fluid. At this time, in the flow path portion 16, a plurality of relatively small air bubbles according to the size of the flow path R are generated (air bubbles are broken up). The air bubbles broken up as described above flow toward the slit 17 formed on the downstream side of the flow path R. In this case, in the flow path portion 16, since the flow path R is formed in the serpentine fashion, and the flow path length can be set to be relatively long, it is possible to set the time required for air bubbles broken up to reach the slit to be long.

Therefore, it is possible to decrease air bubbles which burst in the reservoir tank 10, and decrease the impact force which occurs when air bubbles burst, thereby suppressing vibration of the reservoir body 11, i.e. the reservoir tank 10. As a result, it is possible to effectively suppress transmission of vibration of the reservoir tank 10 to the brake pedal 29 via the master cylinder 21 and so on, and it is possible to prevent the driver who is performing the braking operation from feeling discomfort.

In this case, more specifically, the flow path portion 16 is composed of the plurality of first ribs 161 and the plurality of second ribs 162 provided in the protruding manner so as to be positioned lower than the fluid surface level in the vertical direction from the inner wall surface 111c1 of the top plate portion 111c and arranged so as to face each other, and at least one of the plurality of first ribs 161 is disposed such that the leading end 161b of the first rib 161 which faces the second ribs 162 enters between the leading ends 162b of two neighboring second ribs 162 which face the first rib 161, and at least one of the plurality of second ribs 162 is disposed such that the leading end 162b of the second rib 162 enters between the leading ends 161b of two neighboring first ribs 161.

According to this, the first ribs 161 and the second ribs 162 can surely break up air bubbles generated in the storage chamber 12. Also, since the first ribs 161 and the second ribs 162 can form the flow path R for making air bubbles meander from the storage chamber 12 toward the atmosphere air chamber 13, it is possible to surely make air bubbles flow while meandering. By these, the flow path portion 16 can make small air bubbles broken up slowly meander to the atmosphere air chamber 13 over a long time, and it is possible to make small air bubbles sequentially burst on the fluid surface level connected to the atmosphere air chamber 13. Therefore, it is possible to decrease the impact forces which occur when air bubbles burst, thereby suppressing vibration of the reservoir tank 10.

In this case, the leading ends 161b of the first ribs 161 are disposed closer to the slit 17 which is an opening than the base ends 161a of the first ribs 161 are, and the leading ends 162b of the second ribs 162 are disposed closer to the slit 17 which is an opening than the base ends 162a of the second ribs 162 are.

According to this, air bubbles do not stay on the flow path R which is formed by the first ribs 161 and the second ribs 162, and it is possible to make air bubbles surely and smoothly flow toward the slit 17 which is an opening, i.e. the atmosphere air chamber 13.

In this case, the first ribs 161 and the second ribs 162 have a step shape (an L shape) in which the base end lengths Dk of the base ends 161a and the base ends 162a in the directions along the vertical direction are longer than the leading end lengths Ds of the leading ends 161b and the leading ends 162b in the directions along the vertical direction, from the base ends 161a and the base ends 162a toward the leading ends 161b and the leading ends 162b, and are integrally fixed to the inner wall surface 111c1 of the top plate portion 111c in the vertical directions of the first ribs 161 and the second ribs 162, and the base ends 161a of the first ribs 161 and the base ends 162a of the second ribs 162 are integrally fixed to the peripheral wall part 111a which is the inner surface of the reservoir body 11.

After assembly of the vehicle, when the brake fluid is injected into the storage chamber 12 of the reservoir body 11 from the injection part 14, in order to efficiently inject the brake fluid, so-called vacuum injection is performed. In this case, if the vacuum state in the reservoir body 11 is released after a predetermined amount of brake fluid is injected into the storage chamber 12, a force acts from the inside of the reservoir body 11 toward the outside (in the direction in which the brake fluid expands). With respect to this force, the first ribs 161 and the second ribs 162 can reinforce the mechanical strength of the reservoir body 11 in the vertical direction and the horizontal direction.

By the way, in the case where the reservoir body 11 is formed of a translucent resin material, particularly, in the horizontal direction, a large force acts on the connection parts of the reservoir body 11, and the first ribs 161 and the second ribs 162, whereby a so-called whitening phenomenon may occur in the resin material and the appearance of the reservoir tank 10 may deteriorate. With respect to this, since the first ribs 161 and the second ribs 162 have the step shapes in which the base end lengths Dk are longer than the leading end lengths Ds, it is possible to selectively cause the whitening phenomenon in the corner parts of the step shapes. As a result, it is possible to prevent the whitening phenomenon from occurring in the connection parts of the reservoir body 11, and the first ribs 161 and the second ribs 162, and it is possible to obtain an excellent appearance of the reservoir tank 10.

Also, in this case, the slit 17 which is an opening is formed by the first wall member 171 and the second wall member 172 which are a pair of wall members provided in the protruding manner so as to be disposed on the downstream side of the flow path portion 16 and be positioned lower than the inner wall surface 111c1 of the top plate portion 111c in the vertical direction.

According to this, the slit 17 which is an opening which is formed by the pair of first wall member 171 and the second wall member 172 can further break up air bubbles broken up by the flow path portion 16 and flowing from the storage chamber 12 toward the atmosphere air chamber 13, thereby restricting the sizes of air bubbles, and make the air bubbles flow into the atmosphere air chamber 13. By this, it is possible to more surely decrease the sizes of air bubbles which reach the atmosphere air chamber 13, and it is possible to further decrease the impact forces which occur when air bubbles burst (break). As a result, it is possible to further suppress vibration of the reservoir tank 10.

In these cases, as an opening, the slit 17 is disposed closer to the flow path portion 16 than to the end part of the top plate portion 111c.

According to this, since the slit 17 is formed closer to the flow path portion 16 than to the end part of the top plate portion 111c, i.e. the boundary between the bulge part 111b and the top plate portion 111c (specifically, closer to the storage chamber 12 than to the atmosphere air chamber 13), before air bubbles flowing in the flow path portion 16 enter the atmosphere air chamber 13, it is possible to restrict the sizes of air bubbles. Therefore, it is possible to surely further decrease the impact forces which occur when air bubbles burst (break), and it is possible to further suppress vibration of the reservoir tank 10.

Here, by disposing the slit 17, i.e. the first wall member 171 and the second wall member 172 close to the storage chamber 12 in the horizontal direction, it is possible to simplify, for example, the structure of a mould for forming the upper reservoir 111 in which the bulge part 111b and the top plate portion 111c are formed. By this, it is possible to achieve the secondary effect of being able to maintain the durability of the mould excellent.

Modifications of Embodiment

In the above-described embodiment, the first ribs 161 and the second ribs 162 for constituting the flow path portion 16 are provided in the protruding manner downward along the vertical direction from the inner wall surface 111c1 of the top plate portion 111c of the upper reservoir 111 which is the upper surface of the reservoir tank 10. Also, in the above-described embodiment, the first wall member 171 and the second wall member 172 for forming the slit 17 are provided in the protruding manner downward along the vertical direction from the inner wall surface 111c1 of the top plate portion 111c of the upper reservoir 111.

Figure 9:
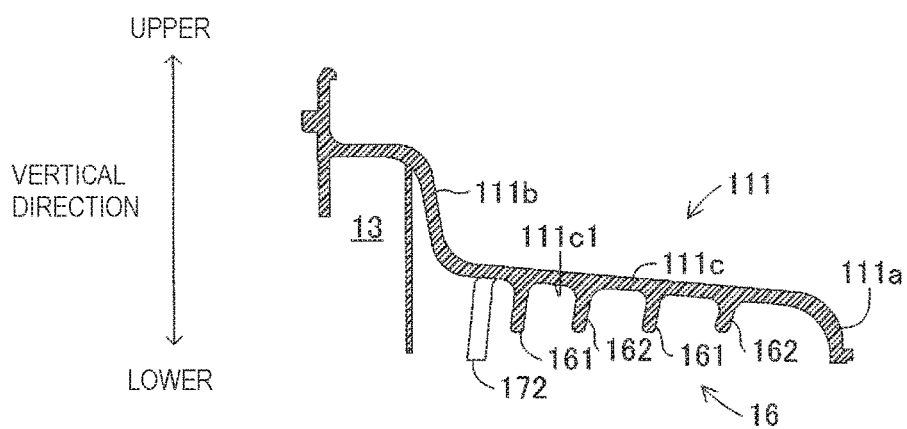
FIG. 9 is a cross-sectional view illustrating a flow path portion according to a modification of the present invention.

In contract with this, the first ribs 161 and the second ribs 162 for constituting the flow path portion 16 may be provided so as to have an inclination with respect to the vertical direction, in a state where the reservoir body 11 has been formed by the upper reservoir 111 and the lower reservoir 112 and the reservoir body 11 (the reservoir tank 10) has been assembled with the master cylinder 21. In this case, it is preferable to provide the first ribs 161 and the second ribs 162 so as to have an inclination on the atmosphere air chamber (13) side with respect to the vertical direction, as shown in FIG. 9.

Similarly, the first wall member 171 and the second wall member 172 for forming the slit 17 may be provided so as to have an inclination with respect to the vertical direction, in a state where the reservoir body 11 (the reservoir tank 10) has been assembled with the master cylinder 21. Even in this case, it is preferable to provide the first wall member 171 and the second wall member 172 so as to have an inclination on the atmosphere air chamber (13) side with respect to the vertical direction, as shown in FIG. 9.

By providing the first ribs 161 and the second ribs 162 for constituting the flow path portion 16, and the first wall member 171 and the second wall member 172 for forming the slit 17, so as to have inclinations on the atmosphere air chamber (13) side with respect to the vertical direction as described above, it is possible to make generated air bubbles more smoothly flow along the flow path R from the storage chamber 12 toward the atmosphere air chamber 13. According to this, it is possible to make the length of the meandering flow path longer as compared to the case where air bubbles linearly flow from the storage chamber 12 toward the atmosphere air chamber 13. Therefore, the flow path portion 16 can make air bubbles generated in the storage chamber 12 slowly and surely flow toward the atmosphere air chamber 13. Therefore, similarly to the above-described embodiment and the above-described modifications, it is possible to make air bubbles broken up subsequently reach the fluid surface level connected to the atmosphere air chamber 13, and it is possible to decrease the impact forces which occur when air bubbles burst (break).

Implementation of the present invention is not limited to the above-described embodiment and the above-described modifications, and various modifications can be made without departing from the object of the present invention.

For example, in the above-described embodiment and the above-described modifications, the flow path portion 16 and the slit 17 are integrally provided on the inner wall surface 111c1 of the top plate portion 111c of the upper reservoir 111. In contrast with this, the flow path portion 16 and the slit 17 may be integrally provided on the opening side end part of the lower reservoir 112.

In this case, the first ribs 161 and the second ribs 162 for constituting the flow path portion 16 are provided so as to protrude upward in the vertical direction from the opening side end part of the lower reservoir 112, and are brought into contact with the peripheral wall part 111a and the inner wall surface 111c1 of the top plate portion 111c of the upper reservoir 111 for forming the reservoir body 11 together with the lower reservoir 112. Also, the first wall member 171 and the second wall member 172 for forming the slit 17 are provided so as to protrude upward in the vertical direction from the opening side end part of the lower reservoir 112, and are brought into contact with the peripheral wall part 111a and the inner wall surface 111c1 of the top plate portion 111c of the upper reservoir 111 for forming the reservoir body 11 together with the lower reservoir 112. According to this, it is possible to expect the same effects as those of the above-described embodiment and the above-described modifications.

Also, in the above-described embodiment and the above-described modifications, the reservoir tank 10 is assembled with the master cylinder 21 such that the atmosphere air chamber 13 is positioned on the front side in the front-rear direction of the vehicle. In this case, disposition of the reservoir tank 10 is not limited thereto, and for example, the reservoir tank 10 may be disposed such that the storage chamber 12 and the atmosphere air chamber 13 are lined up in the left-right direction of the vehicle.

Also, in the embodiment and the modifications described above, the reservoir tank 10 is applied to the brake device 1. In contrast with this, the reservoir tank 10 can also be applied to, for example, a transmission device having a clutch pedal.

Further, in the above-described embodiment and the above-described modifications, the flow path portion 16 is composed of the first ribs 161 and the second ribs 162 having the plate shape, so as to make air bubbles flow while meandering from the storage chamber 12 toward the atmosphere air chamber 13. In this case, for example, as shown in FIG. 10, curved wall members 164 may be provided in a protruding manner downward in the vertical direction with respect to the inner wall surface 111c1 of the top plate portion 111c of the upper reservoir 111, so as to constitute a flow path portion 16. Also, in this case, in place of the first ribs 161 and the second ribs 162, for example, as shown in FIG. 11, first protrusions 165 and second protrusions 166 which protrude so as to face each other in the horizontal direction may be provided in a protruding manner with respect to the inner wall surface 111c1 of the top plate portion 111c of the upper reservoir 111 so as to constitute the flow path portion 16. Even in the case of using the curved wall members 164, the first protrusions 165, and the second protrusions 166 to constitute the flow path portion 16 having one or more flow paths R as described above, it is possible to break up air bubbles, and it is possible to make air bubbles slowly flow while meandering from the storage chamber 12 toward the atmosphere air chamber 13. Therefore, even in the case, it is possible to expect the same effects as those of the above-described embodiment.

The invention claimed is:

1. A reservoir tank which includes a reservoir body formed in a hollow box shape for storing a hydraulic fluid inside the reservoir tank, and is connected to a vehicle master cylinder in such a way that the hydraulic fluid flows into and out, wherein:
   the reservoir body includes a top plate portion formed in a plate shape,
   on an inner wall surface of the top plate portion, a flow path portion which has one or more flow paths formed in a serpentine fashion so as to be opened toward a lower side in a vertical direction is provided in a protruding manner,
   on a downstream side of the flow path, an opening is formed, the flow path portion is composed of a plurality of first ribs and a plurality of second ribs provided in a protruding manner from the inner wall surface of the top plate portion and arranged so as to face each other, at least one of the plurality of first ribs is disposed such that a leading end of the first rib facing the second ribs enters between leading ends of two neighboring second ribs facing the first ribs, and at least one of the plurality of second ribs is disposed such that a leading end of the second rib enters between leading ends of two neighboring first ribs.

2. The reservoir tank according to claim 1, wherein:

the leading ends of the first ribs are disposed closer to the opening than the base ends of the first ribs are, and the leading ends of the second ribs are disposed closer to the opening than the base ends of the second ribs are.

3. The reservoir tank according to claim 2, wherein:

the first ribs and the second ribs have such a step shape that the base end lengths of the base ends in directions along the vertical direction are longer than the leading end lengths of the leading ends in directions along the vertical direction, from the base ends toward the leading ends, and the upper ends of the first ribs and the second ribs in the vertical direction are integrally fixed to the inner wall surface of the top plate portion, and the base ends of the first ribs and the base ends of the second ribs are integrally fixed to the inner surface of the reservoir body.

4. The reservoir tank according to claim 1, wherein:

the opening is a slit formed by a pair of wall members disposed on the downstream side of the flow path portion and provided in a protruding manner from the inner wall surface of the top plate portion toward the lower side in the vertical direction.

5. The reservoir tank according to claim 4, wherein:

the opening is disposed closer to the flow path portion than to an end part of the top plate portion.

6. A reservoir tank which includes a reservoir body formed in a hollow box shape for storing a hydraulic fluid inside the reservoir tank, and is connected to a vehicle master cylinder in such a way that the hydraulic fluid flows into and out, wherein:

the reservoir body includes a top plate portion formed in a plate shape, on an inner wall surface of the top plate portion, a flow path portion which has one or more flow paths formed in a serpentine fashion so as to be opened toward a lower side in a vertical direction is provided in a protruding manner, on a downstream side of the flow path, an opening is formed, and the opening is a slit formed by a pair of wall members disposed on the downstream side of the flow path portion and provided in a protruding manner from the inner wall surface of the top plate portion toward the lower side in the vertical direction.

7. The reservoir tank according to claim 6, wherein:

the opening is disposed closer to the flow path portion than to an end part of the top plate portion.

* * * * *